United States Patent
Schwerdtner

(10) Patent No.: US 8,120,828 B2
(45) Date of Patent: Feb. 21, 2012

(54) REFLECTIVE OPTICAL SYSTEM, TRACKING SYSTEM AND HOLOGRAPHIC PROJECTION SYSTEM AND METHOD

(75) Inventor: Armin Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 260 days.

(21) Appl. No.: 12/300,476

(22) PCT Filed: Feb. 6, 2007

(86) PCT No.: PCT/EP2007/051094
§ 371 (c)(1),
(2), (4) Date: Mar. 10, 2009

(87) PCT Pub. No.: WO2007/131810
PCT Pub. Date: Nov. 22, 2007

(65) Prior Publication Data
US 2009/0310197 A1   Dec. 17, 2009

(30) Foreign Application Priority Data
May 12, 2006  (DE) .......................... 10 2006 024 092

(51) Int. Cl.
*G02B 5/32* (2006.01)
*G03H 1/26* (2006.01)

(52) U.S. Cl. ................ 359/15; 359/32; 359/13; 359/22; 345/32

(58) Field of Classification Search ................ 359/9, 13, 359/15, 22, 32; 345/32
See application file for complete search history.

(56) References Cited

U.S. PATENT DOCUMENTS

| | | | |
|---|---|---|---|
| 5,187,597 A * | 2/1993 | Kato et al. ...................... | 359/22 |
| 5,566,012 A | 10/1996 | Koshimizu et al. | |
| 5,898,511 A | 4/1999 | Mizutani et al. | |
| 6,927,748 B2 * | 8/2005 | Hughes et al. .................. | 345/32 |
| 2003/0107789 A1 | 6/2003 | Hishioka | |
| 2004/0196524 A1 | 10/2004 | Hughes et al. | |

FOREIGN PATENT DOCUMENTS

| | | |
|---|---|---|
| GB | 2363273 | 12/2001 |
| GB | 2 379 347 | 3/2003 |
| WO | WO 2004/034137 | 4/2004 |

OTHER PUBLICATIONS

Coomber et al., "Optically Addressed Spatial Light Modulators for Replaying Computer Generated Holograms," Proc. of the SPIE—The Intl. Society for Optical Engineering SPIE-INt. Soc. Opt. Eng USA, vol. 4457, pp. 9-19 (2001) XP002453625.
International Search Report, dated Oct. 18, 2007, issued in priority International Application No. PCT/EP2007/051094.

* cited by examiner

*Primary Examiner* — Audrey Y Chang
(74) *Attorney, Agent, or Firm* — Saul Ewing LLP

(57) ABSTRACT

The invention relates to an optical reflection system with a reflection element for reflecting reconstruction light waves, an entry-side focal point, from which the reconstruction light waves come when they hit the reflection element, and an exit-side focal point, to which the reconstruction light waves propagate after being reflected from the reflection element. The invention further relates to a tracking system and a holographic projection system with such optical reflection system, and a corresponding holographic projection method. In order to achieve with such an optical reflection system an aberration correction and a tracking of the visibility region and a reconstruction larger than with prior art devices, the optical reflection system according to this invention comprises a deflection element with optically controllable deflection properties and a deflection control means for optically controlling the deflection properties of the deflection element which controls the position of at least the exit-side focal point of the optical reflection system.

19 Claims, 5 Drawing Sheets

REFLECTIVE OPTICAL SYSTEM, TRACKING SYSTEM AND HOLOGRAPHIC PROJECTION SYSTEM AND METHOD

CROSS REFERENCE TO RELATED APPLICATIONS

This application claims the priority of PCT/EP2007/051094, filed on Feb. 6, 2007, which claims priority to DE 10 2006 024092.8, filed May 12, 2006, the entire contents of which are hereby incorporated in total by reference.

FIELD OF THE INVENTION

The invention relates to a reflective optical system with a reflection element for reflecting reconstruction light waves, an entry-side focal point, from which the reconstruction light waves come when they hit the reflection element, and an exit-side focal point, to which the reconstruction light waves reflected by the reflection element propagate. The invention further relates to a tracking system and a holographic projection system with such a reflective optical system, and a corresponding holographic projection method.

BACKGROUND OF THE INVENTION

Holographic projection devices modulate sufficiently coherent light by means of spatial light modulator means. Due to interference of the light, object light points reconstructing the optical appearance of a scene are created in a space in front of, on and behind the surface of the light modulator. The entirety of the light of all object light points propagates in the form of a light wave front, so that one or multiple observers observe those object light points in the form of a three-dimensional scene. This means that in contrast to a stereoscopic representation, a holographic reconstruction realises an object substitute, and the problems known in conjunction with stereoscopy, such as fatigue or aching eyes and headache, do not occur, because in principle there is no difference between the observation of a real scene and a holographically reconstructed scene.

From the earlier patent application DE 10 2005 023 743 filed by the applicant a holographic projection system is known, where a pupil is situated in a Fourier plane of a spatial light modulator (SLM) and acts as a spatial filter, for a diffraction order of the Fourier transform of a hologram provided by the SLM. This pupil is projected by a deflection element or adaptive mirror into a visibility region in an observer plane; from the visibility region an observer can watch an enlarged holographic reconstruction of a real existing object or a scene. In other words, the visibility region is the image of the diffraction order used e.g. of the Fourier transform (the Fresnel transform etc. would be possible as well) of the hologram in the observer plane, i.e. the plane where the eye position of the observer is situated. The size of the adaptive mirror determines the size of the reconstruction. For example, the adaptive mirror preferably has a size of about 20 inches diagonal.

At the same time it must be noted that the larger the visibility region the higher must be the resolution of the SLM used. In order to get a large visibility region, the SLM must have small pixel apertures which cause a large diffraction angle, i.e. the pixel pitch must be small and, consequently, the number of pixels must be large.

In order to reduce the necessary resolution of the SLM, the size of the visibility region can be diminished for example to the size of an eye pupil. It is therefore necessary for the visibility region to be tracked to the observer eyes if the observer moves. The adaptive mirror must project the pupil into the visibility region.

So called adaptive MEMS (micro electro-mechanical system) mirrors are known from the prior art. These comprise a micro-mirror array, the micro-mirrors being capable of performing tilting and lifting movements. This allows creating a surface which has any curvature within a given adjustment range. However, until now such micro-mirror arrays were only available in sizes up to about 1 inch diagonal. An adaptive mirror with a size of, for example, about 20 inches diagonal, as required in a holographic projection system, would be very difficult to make, and it would require a very large number of movable mirrors.

An electronically addressable spatial light modulator (EA-SLM) as a controllable diffractive optical element (DOE) would have a very large number of small pixels because of the large size and the required large diffraction angles, and it is thus not feasible technologically to realize such an element. Assuming a pixel pitch for example of 5 µm, a SLM with a diagonal of 20 inches would comprise $5*10^9$ (five billion) pixels. This would be about three decimal powers (one thousand times) more pixels than EASLMs commercially available today have.

SUMMARY OF THE INVENTION

It is therefore the object of the present invention to provide in a holographic projection system a reflective optical system which allows larger reconstructions to be realised than is possible using prior art devices, and which further allows aberrations to be corrected and the visibility region to be tracked.

This object is achieved by means of a deflection element with optically controllable deflection properties and a deflection control means for optically controlling the deflection properties of the deflection element for controlling the position of at least the exit-side focal point of the reflective optical system.

Further, said object is achieved by means of a tracking system, a holographic projection system, and a holographic projection method as described herein.

The invention is based on the idea that aberrations during the projection of the wave front into the visibility region can be avoided if the reflective optical system has an elliptic shape, i.e. the reflecting surface is stretched over a section of a circumference of an ellipse (illustrated in FIG. 2). An ellipse has two focal points, F1 and F2, here also referred to as the entry-side focal point and the exit-side focal point, respectively, with the characteristic that all rays of light which come from F1 and which are reflected from the ellipse run through F2 and vice versa. This means that F1 is projected onto F2 almost without any aberrations, even if the reflective optical system has a large aperture. If the pupil is located at F1, the pupil will be projected into the visibility region located at F2. This image is almost free of aberrations if the dimensions of the pupil and of the visibility region are small compared with the semi-axes of the ellipse. Because both the pupil and the visibility region are small compared with the distance between the observer and the reflective optical system, they can be regarded as points. The lengths and orientations of the semi-axes of the ellipse can be determined based on the positions of the pupil, the visibility region and the reflective optical system, i.e. based on F1, F2 and the reflective optical system. If pupil and the visibility region are arranged in fixed positions, an almost aberration-free projection of the pupil into the visibility region is possible. If the observer moves, however, the lengths and orientations of the semi-axes of the ellipse must be modified. This is not possible with a static mirror.

The invention is further based on the idea that the reflective optical system comprises in addition to a curved basic mirror an optically addressable spatial light modulator (OASLM). An OASLM typically comprises an LC (liquid crystal) layer, where the orientation of the LC molecules and thus the light modulation are optically controlled. A controllable diffractive structure is generated on that OASLM, so that the combination of the reflection from the basic mirror and the diffraction of light by the controllable diffractive structure corresponds to the desired surface shape. Alternatively, a controllable refractive index variation is generated on the OASLM, so that the combination of the reflection from the basic mirror and the refraction of light at the controllable refractive index variation on the OASLM corresponds to the desired surface shape. The variation in the refractive index of the OASLM can effect phase and/or amplitude modulation. A phase modulation is preferred because of the higher diffraction efficiency.

A major advantage compared with a static elliptic mirror is that such an adaptive mirror is controllable. If the observer moves, the structure written to the OASLM will be changed such that the pupil remains in the focal point F1, and the visibility region with the focal point F2 remains on the observer eye position. The position of the visibility region is determined by the focal point F2 and can also extend in front of or behind the focal point F2, seen in the direction of the reflected light. The lateral extent of the visibility region can for example be reduced to the size of an eye pupil.

The basic mirror supports the effect of the OASLM. A curved basic mirror and an OASLM with a diffractive structure have the same effect as two series-connected lenses whose refraction power values are added. If the basic mirror is curved such that it generates the image of the pupil in the visibility region for a standard position of the visibility region, the OASLM has the function of a controllable correction lens. This correction lens allows on the one hand tracking of the visibility region according to the movements of the observer. On the other hand, it allows the image of the curved mirror to be corrected in order to achieve an aberration-free image of the pupil in the visibility region.

This optically controllable refractive index variation can for example be used in order to generate a controllable diffractive structure on the OASLM. This diffractive structure is for example designed such that the light emanating from the pupil is diffracted by the OASLM and the visibility region takes the desired position.

The advantage of an OASLM in contrast with an EASLM is that an OASLM does not have a pixel structure. This is why a continuous diffractive structure, which is not scanned discretely, can be displayed on the OASLM. As a consequence, periodic continuations of the diffraction pattern can be avoided. However, this is only possible if the structure written to the OASLM does not have a pixel structure. If for example an EASLM is used to write on to the OASLM, and if the OASLM is not illuminated in the intermediate regions between the pixels of the EASLM, then the structure on the OASLM has some periodicity and thus there are periodic continuations of the diffraction pattern. In order to prevent such periodic continuations, it is therefore desired for the structure written to the OASLM to be scanned continuously and not discretely. This is for example supported by a limited resolution of the projection of the EASLM on to the OASLM or by a limited resolution of the OASLM itself.

In addition, the invention has the major advantage that it allows larger reconstructions to be realised than prior art solutions, because projection display devices of the required size are feasible to be made, too. Moreover, if this invention is used, the dynamic effort of the reflective optical system is lower than that of a merely dynamic reflective optical system without any static component, whereby the flexibility is increased at the same time, because the computational load required to generate the desired refractive index variation is lower compared with the prior art. Finally, the degree of complexity of the entire system is reduced.

In a preferred embodiment of the invention, the deflection control means is further provided in order to optically control the deflection properties of the deflection element for controlling the position of the entry-side focal point and/or for correcting aberrations. This way the tracking range of the visibility region is enlarged while less control and computing effort is required for the deflection element, and possible aberrations in the optical path can be corrected.

It is further preferred that at least the reflection element has the effect of a reflecting surface which is substantially elliptically curved. In other words, the reflecting surface is stretched over a section of the circumference of an ellipse. As described above, this has the advantage that incident light coming from the entry-side focal point is reflected from the reflective optical system to the exit-side focal point almost without any aberrations. There are two special cases of elliptic curvature, a circular curvature and an infinite radius of curvature; any curvature in between these cases is possible. By way of choosing the radius of curvature, the position of the focal points can be preselected. For example, if in the tracking system the distance between a pupil for spatial filtering of light waves propagating towards the reflection element of the reflective optical system and the position of observer eyes is large in a basic arrangement, an accordingly large radius of curvature of the elliptically curved reflecting surface can be provided. The curvature does not necessarily have to be generated mechanically. It is also possible to only create the effect of a substantially elliptically curved reflecting surface by means of optical elements. The overall effect of the reflective optical system is determined by the combination of the deflection properties of the statically curved reflection element and the controllable deflection properties of the deflection element.

According to another preferred embodiment of the invention, the reflection element is of at least a partly transparent design. This comprises on the one hand, that only sub areas of the reflection element or the reflection element as a whole are transparent. On the other hand, this also comprises that the reflection element is transparent, for example, only in one direction or for a certain type of light, i.e. certain wavelengths, polarisations etc. Even a combination of several of those options is possible.

The reflection element is preferably integrated into the deflection element. This way the spatial dimensions of the reflective optical system are reduced. Moreover, thereby the adjustment during the assembly process is facilitated, since the reflection element does not have to be aligned with the deflection element after manufacture.

Furthermore, the deflection element preferably has an optically controllable diffractive and/or refractive structure. This makes it possible to modify both the diffraction and the refraction properties of the deflection element in order to achieve the desired shape of the light wave front. The deflection element is preferably designed in the form of an optically addressable spatial light modulator. According to a preferred embodiment, this spatial light modulator comprises a first glass plate with a transparent electrode, an LC layer with LC molecules whose orientation can be changed by way of optical control, a photosensitive semiconductor layer and a second glass plate. According to another preferred embodiment, the photosensitive semiconductor layer is of an at least partly transparent design. As already mentioned for the reflection element, this partial transparency can be for the semiconductor layer or parts thereof as such, but it can also comprise the transparency in a certain direction, for light of certain wavelengths, polarisations etc. It may also be preferred that the semiconductor layer has a band structure which can be affected by the deflection control means, but not by the reconstruction light waves. These embodiments represent several options of preventing the semiconductor layer from being affected by the reconstruction light waves. A design of the semiconductor layer which provides transparency for the reconstruction light waves is for example required in the case that the reflection element is disposed behind the semiconductor layer, seen from the direction of the focal points of the reflective optical system, so that the reconstruction light waves will not be absorbed in the semiconductor layer.

According to a preferred embodiment, the reconstruction light waves, which come from the entry-side focal point, hit the reflection element and are reflected from it, thereby holographically reconstructing a scene in front of the exit-side focal point.

Further, the deflection control means is preferably designed such that it controls the deflection properties of the deflection element from a direction away from the entry-side focal point and the exit-side focal point. The deflection control means can further be designed as an electronically addressable spatial light modulator for projecting writing light on to the deflection element, or as a scanning laser beam, whose intensity can be controlled, for scanning the deflection element. According to a further embodiment, the deflection control means can comprise two interfering coherent light sources, which are disposed in the entry-side focal point and in the exit-side focal point, respectively, and whose interference pattern is suitable for controlling the deflection properties of the deflection element.

It is further possible that the reflective optical system additionally comprises a dichroic layer or that the reflection element has dichroic properties, where reconstruction light waves and writing light provided by the deflection control means differ in wavelength. Further, the reflective optical system can comprise a reflective polarisation filter, or the reflection element can have properties of a polarisation filter, where reconstruction light waves and writing light provided by the deflection control means differ in polarisation. These embodiments allow writing light or reconstruction light waves to be filtered in order to prevent the semiconductor layer and the visibility region from having an undesirable mutual influence.

However, the deflection control means for controlling the deflection properties of the deflection element preferably provides writing light in a wavelength range which is invisible for the human eye. This renders it unnecessary to filter out the writing light in the visibility region.

A tracking system according to this invention preferably comprises a position control means for controlling the position of the pupil or of an identical image of the pupil in the entry-side focal point of the reflective optical system. It is also possible to change the position of the pupil only virtually, e.g. using mirrors etc. When changing the position of the pupil or of an image thereof, the computational load required for tracking the exit-side focal point and the demands made on the dynamic properties of the reflective optical system can be reduced. Accordingly, a holographic projection method according to this invention comprises the positioning of the pupil in the entry-side focal point of the reflective optical system.

BRIEF DESCRIPTION OF THE DRAWINGS

The present invention is described in more detail below on the basis of the embodiments and with reference to the drawings.

DETAILED DESCRIPTION OF THE INVENTION

A reflective optical system 10, 11 according to this invention comprises a deflection element 12, 13 and a reflection element 14, 15. Light waves which hit the reflection element 14, 15 are reflected from it, and their optical path is further modified by the deflection element 12, 13. This deflection can include a correction of aberrations and a change in the direction of the light waves' propagation.

Figure 1A:
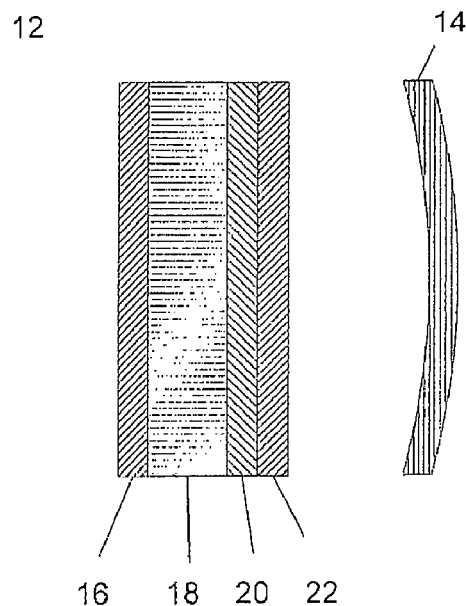
FIGS. 1a, b is a top view showing the design of a deflection element and that of a reflection element of a reflective optical system according to a first and a second embodiment of the present invention.

FIG. 1a is a top view showing the design of a deflection element 12 and a reflection element 14 of a reflective optical system 10 according to a first embodiment of the present invention, with an optically addressable spatial light modulator (OASLM) with a diffractive structure as the deflection element 12 and a static basic mirror as the reflection element 14. The basic mirror 14 can for example be a metallic mirror with a reflecting surface.

The OASLM 12, which is disposed in front of the basic mirror 14, seen from the focal points, comprises a first glass plate 16 with a transparent electrode, an LC layer 18 which forms the diffractive structure of the OASLM 12 and which has LC molecules, a transparent photosensitive semiconductor layer 20 and a second glass plate 22 as substrate. According to this embodiment, the photosensitive semiconductor layer 20 is transparent, so that reconstruction light waves can pass on to the reflection element 14 disposed behind. Generally, the reconstruction light waves must not be absorbed in the semiconductor layer, and the semiconductor layer must not be affected by the reconstruction light waves either. Further, writing light provided by the deflection control means must not be visible to the observer in the visibility region.

Figure 1B:
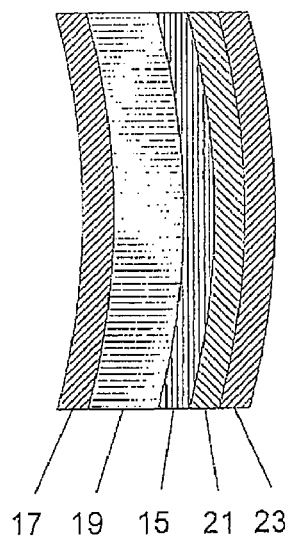

FIG. 1b is a top view showing the design of a deflection element 13 and a reflection element 15 of a reflective optical system 11 according to a second embodiment of the present invention, with an optically addressable spatial light modulator (OASLM) with a diffractive structure as deflection element 13, where the reflection element 15 is integrated into said OASLM in the form of a reflective layer.

In the second embodiment, the OASLM 13 comprises a glass plate 17 with a transparent electrode, an LC layer 19, which forms the diffractive structure of the OASLM 13 and which has LC molecules, a photosensitive semiconductor layer 21 and a glass plate 23 as substrate. The reflection element 15 is integrated between the LC layer 19 and the semiconductor layer 21 in this second embodiment.

Figure 2:
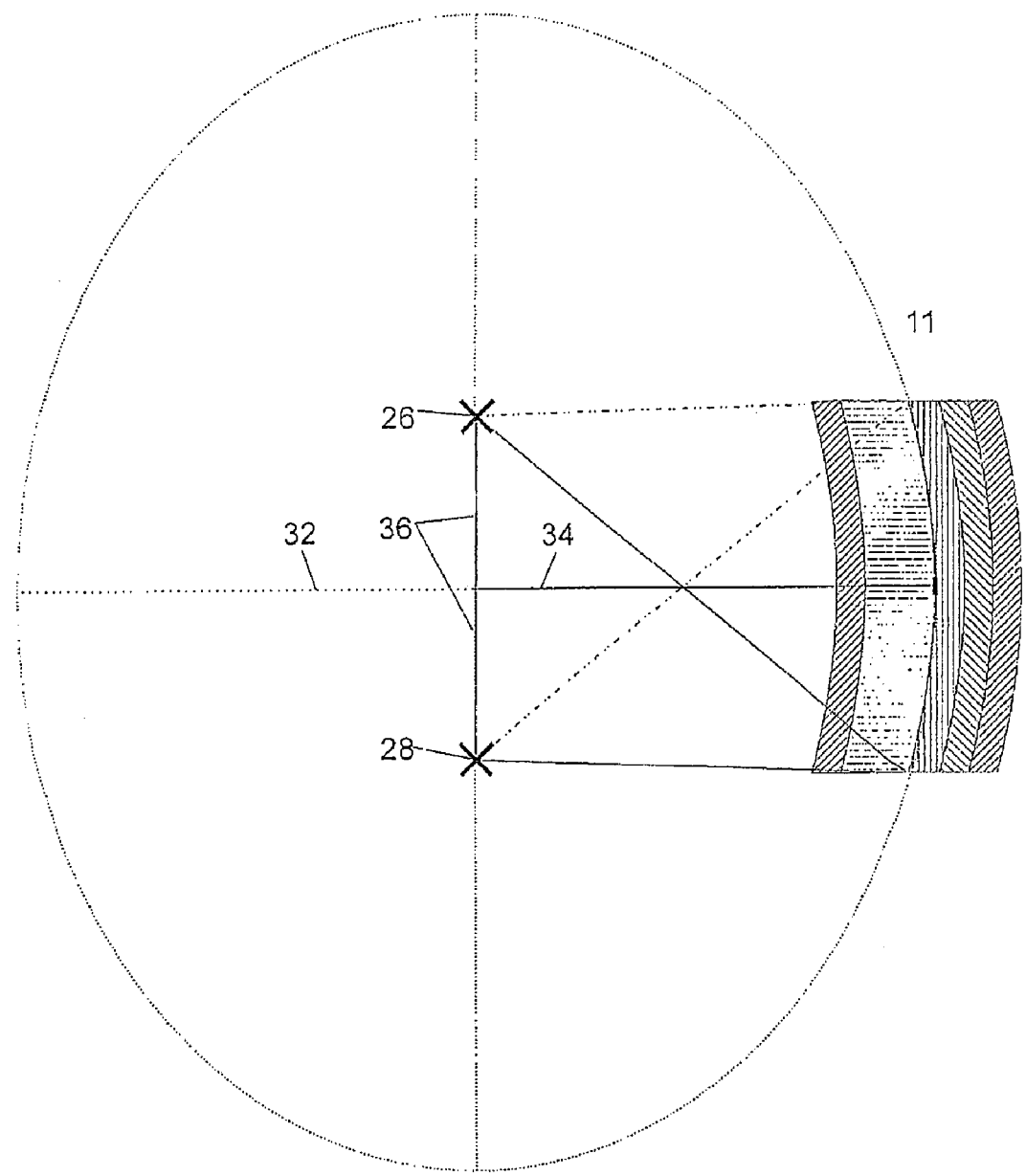
FIG. 2 is a top view showing the deflection element and the reflection element of the reflective optical system according to the second embodiment, thereby illustrating geometric relations.

Referring to FIG. 2, the geometric relations in a reflective optical system according to this invention will now be explained for the arrangement shown in FIG. 1b (these may be applied also to the arrangement shown in FIG. 1a or any other alternative arrangement).

The reflection element 15 has an elliptically curved reflecting surface with two focal points: an entry-side focal point 28 and an exit-side focal point 26. Further, the reflective optical system 11 has an optical axis 32 which is disposed in the centre of and perpendicular to the reflective optical system 11 or to the reflection element 15. The distance from the centre of the line connecting the entry-side focal point 28 and the exit-side focal point 26 to the reflecting surface of the reflection element 15 forms the semi-minor axis 34 of the ellipse, according with the form or effect of which the reflective optical system 11 has. The respective distance 36 from the entry-side focal point 28 and from the exit-side focal point 26 to the semi-minor axis 34 is the eccentricity of the ellipse.

Figure 3A:
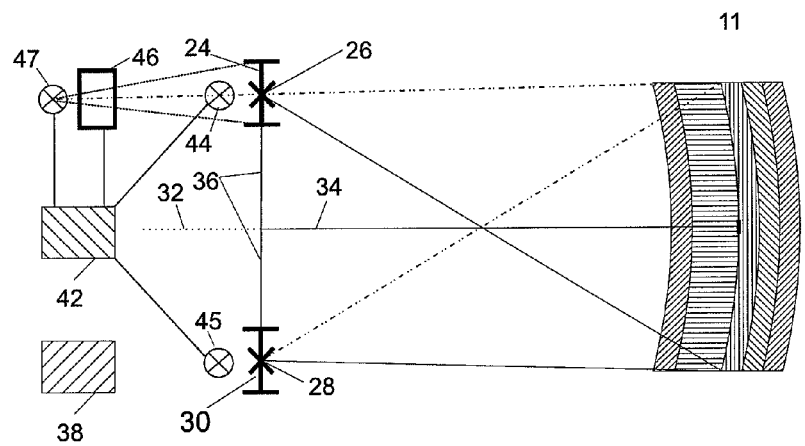
FIGS. 3a, b is a top view showing a tracking system with the reflective optical system according to the second embodiment of the present invention with different arrangements of the deflection control means.

The optically controllable deflection properties of the deflection element are controlled by means of a deflection control means 42, 43 (FIGS. 3a, b). There is an electric field between the photosensitive semiconductor layer 20, 21 and the first glass plate 16, 17 with the transparent electrode. If an area of the photosensitive semiconductor layer 20, 21 is illuminated with writing light provided by the deflection control means, the electric field will vary locally. This, in turn, changes the orientation of the LC molecules in the LC layer 18, 19 and thus also the local refractive index. The variation in the refractive index of the OASLM 12, 13 can effect phase or amplitude modulation. A phase modulation is preferred because of the higher diffraction efficiency.

Generally, this change can be mono-stable or bi-stable. In the case of mono-stability, the refractive index variation is only present as long as the semiconductor layer is being illuminated. In the case of bi-stability, the refractive index variation will continue after the layer ceases to be illuminated, until a voltage supplied to the OASLM will reset the device to its initial condition.

The reflective optical system 10, 11 according to the first or second embodiment can be used in a tracking system for tracking the position of the exit-side focal point and/or for correcting aberrations occurring in the system, or it can be used in a corresponding holographic projection system.

Figure 3B:
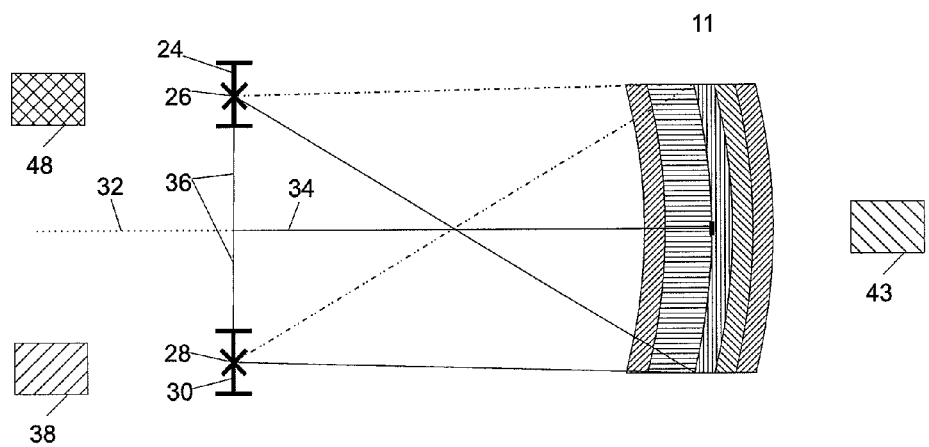

FIG. 3a shows a representative tracking system with the reflective optical system 11 according to the second embodiment of the present invention with a deflection control means 42 and a holographic reconstruction means 38 in the form of a spatial light modulator (SLM) for emitting reconstruction light waves towards the reflective optical system 11. FIG. 3b shows an alternative arrangement of the deflection control means 43 in relation to the reflective optical system 11. FIGS. 3a, b also show a pupil 30, which is disposed in a Fourier plane and in a diffraction order of the reconstruction means 38 as well as in the entry-side focal point 28 of the reflective optical system 11, and the exit-side focal point 26 in a visibility region 24.

In the tracking system shown in FIG. 3a, the deflection control means 42, which here provides writing light in the form of a scanning laser beam 47, is disposed on the same side of the reflective optical system 11 as its focal points 26, 28. Because of the fact that a scanning laser beam is used, which is focussed on the semiconductor layer 21 of the OASLM 13 and which is thereby scanning it, the refractive index variation in the LC layer 19 is a bi-stable one in this embodiment. The intensity of the laser beam is modulated in synchronism with its movement, so that the semiconductor layer 21 is exposed to the required intensity distribution. This method is only possible if a bi-stable OASLM is used, so that the diffractive structure exists as a whole. The writing light provided by the deflection control means 42 is light in a wavelength range that is invisible to the human eye, so that the writing light is not perceived by the observer in the visibility region 24.

In the tracking system according to FIG. 3a, modulated light waves coming from the reconstruction means 38 propagate through the pupil 30 disposed in the entry-side focal point 28 of the reflective optical system 11 towards that reflective optical system 11. Because the pupil 30 is positioned in a diffraction order of the reconstruction means 38, it only lets pass light of that diffraction order. The light emanating from the pupil 30 holographically reconstructs a three-dimensional scene. The reflective optical system 11 reflects the incident light from the entry-side focal point 28 or pupil 30 into the exit-side focal point 26 or the visibility region 24, which is positioned on an observer eye position as detected by an eye position detection means (not shown in the Figures). This way, the observer can watch the holographically reconstructed scene.

An almost aberration-free projection is possible if the reflective optical system 11 has the effect of an elliptic mirror, if the entry-side focal point 28 of the ellipse is in the centre of the pupil 30, and if the exit-side focal point 26 of the ellipse is on the eye position. In order to keep the dynamic requirements on the OASLM 13 of the reflective optical system 11 as low as possible, the reflection element 15 is shaped and the reconstruction means 38 is disposed such that for a typical observer position the pupil 30 and the visibility region 24 have the same distance to the optical axis 32. In that position, which can also be referred to as the initial position, the reflective optical system 11 only effects a correction of the deviation of the reflection element 15 from the ideal elliptic shape, and a correction of aberrations caused by other influences.

In order to track the visibility region 24 to the observer eye position, a diffractive structure is written to the OASLM 13 of the reflective optical system 11 by the deflection control means 42 such that the combined effect of the reflection element 15 and of the LC layer 19 corresponds with the elliptic curvature required to track the visibility region 24. This required elliptic curvature results from the condition that the centre of the pupil 30 is in the entry-side focal point 28 of the ellipse and the visibility region 24 is on the observer eye position.

FIGS. 4a to 4d show diagrams of the tracking system with the reflective optical system 11 according to the second embodiment of the present invention with different eye positions. In order to keep the diagrams simple only those components are shown which are essential for understanding the tracking method. However, the general design is the same as shown in FIG. 3a, and it represents the design of the reflective optical system 10 as shown in FIG. 1a.

Figure 4A:
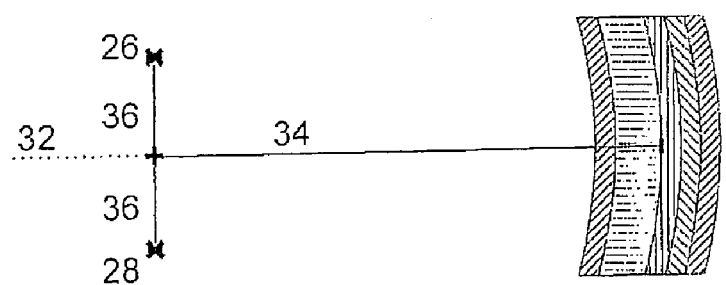
FIGS. 4a-d are top views showing simplified diagrams of the tracking system with the reflective optical system according to the second embodiment of the present invention with different eye positions.

FIG. 4a is a simplified diagram of the situation shown in FIG. 3a, with the entry-side focal point 28, the exit-side focal point 26 and the reflective optical system 11. The entry-side focal point 28, which is in the centre of the pupil 30, and the exit-side focal point 26 are in an initial position, i.e. their positions are not influenced by the deflection element, and they have the same distance 36 to the optical axis 32 of the reflective optical system 11. As already mentioned above, in this arrangement the reflective optical system 11 only effects a correction of the deviation of the reflection element 15 from the ideal elliptic shape, and a correction of aberrations.

Figure 4B:
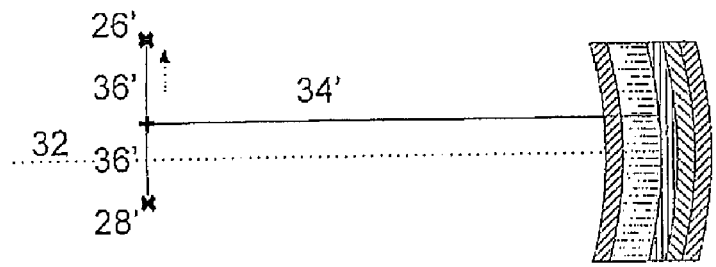

FIG. 4*b* is a simplified diagram of a situation where the observer has moved at a right angle to the optic axis 32, as indicated by the dotted arrow. The eye position of the observer is further away from the optic axis 32 than the pupil 30, whose centre is on the entry-side focal point 28. The semi-minor axis 34' is parallel to the optic axis 32. The reflective optical system 11 must compensate this movement and adjust the exit-side focal point 26' to the eye position of the observer. This means that the OASLM 13 must be controlled by means of the deflection control means such that the exit-side focal point 26' in the centre of the visibility region 24 lies on the shifted eye position of the observer again. This is caused by changing the orientation of the LC molecules in the LC layer as described above. Generally, the deflection angle of the light depends on the orientation of the LC molecules or the refractive index of the LC layer. The overall effect of the reflective optical system 11 must accord with a changed elliptic curvature characterized by the eccentricity 36' and the semi-minor axis 34'. Because in this case the semi-minor axis 34' no longer lies on the optic axis 32, the OASLM 13 is required to have a higher resolution in order to counteract the curvature of the reflection element 15 at least partly, or the tracking range will be limited.

Figure 4C:
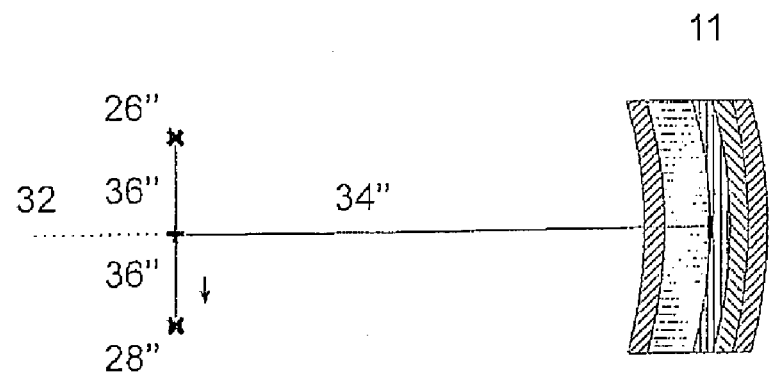

FIG. 4*c* also shows a situation where the observer has moved at a right angle to the optic axis 32. However, in this case also the entry-side focal point 28" has been displaced by the same distance to the optic axis 32, as indicated by the dotted arrow, as the exit-side focal point 26", which again lies on the eye position of the observer, so that the semi-minor axis 34" coincides with the optical axis 32. In addition, the centre of the pupil 30 is positioned on the shifted entry-side focal point 28" by means of a position control means 48 (shown in FIG. 3*b*). The pupil 30 does not necessarily have to be moved physically, but the effect of the movement must be achieved. For example, the position control means may be a combination of a rotating mirror and a static elliptic mirror. The overall effect of the reflective optical system 11 must accord with a changed elliptic curvature characterized by the eccentricity 36" and the semi-minor axis 34". With this symmetrical arrangement of the entry-side focal point 28" and exit-side focal point 26" in relation to the optic axis 32, the OASLM 13 is required to have a lower resolution than in the asymmetrical arrangement shown in FIG. 4*b*, because the elliptic curvature of the reflection element 15 only has to be amplified or diminished.

Figure 4D:
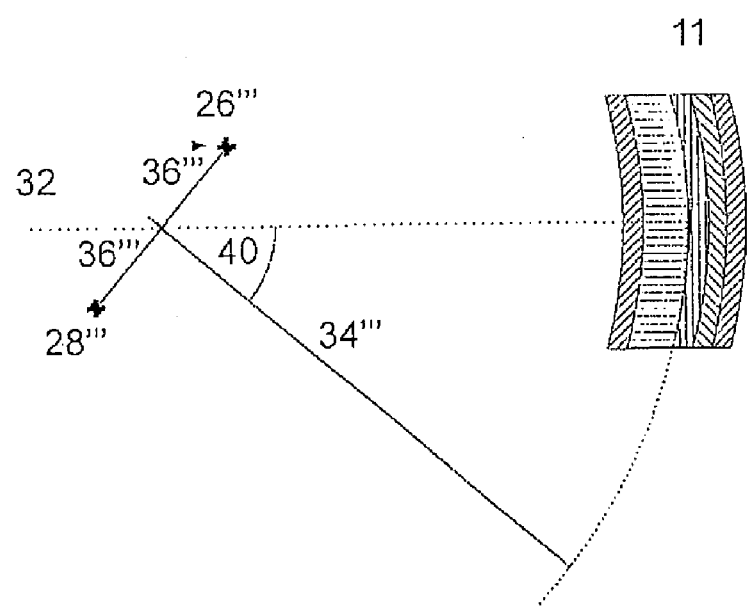

FIG. 4*d* shows a situation where the observer has moved at a right angle to the reflective optical system 11, and the pupil 30 is in a fixed position. Accordingly, the OASLM 13 must be controlled such that the position of the entry-side focal point 28''' stays on the centre of the pupil 30, while the position of the exit-side focal point 26''' is adapted to the new observer position, i.e. the exit-side focal point 26''' is moved to the eye position of the observer. The semi-minor axis 34''', which is in this case perpendicular to an imaginary extension of the elliptic reflecting surface, is here no longer parallel to the optic axis 32. The required diffractive structure on the OASLM 13 for tracking the exit-side focal point 26''' to the eye position of the observer is determined here based on the eccentricity 36''', the length of the semi-minor axis 34''', and its angle 40 to the optic axis 32. This arrangement, where the distance of the observer to the reflective optical system 11 is smaller than the distance of the pupil 30 to the reflective optical system 11, has at the same time the optical effect of enlarging the scene for the observer.

In the above, a tracking system and method with a reflective optical system according to the second embodiment have been described. However, a reflective optical system according to the first embodiment or alternative embodiments may be used instead. Now, further options of implementing the present invention will be indicated below; however, this shall not be construed to limit the invention to these examples. It will be obvious to those skilled in the art that the several embodiments can also be combined.

In analogy with the diffractive light modulation using a diffractive structure on the OASLM, as explained by means of the aforementioned embodiments, it is also possible in an alternative embodiment for example that the deflection element has a refractive structure or a combination of a diffractive and a refractive structure, so that, consequently, also a refractive light modulation is feasible on the OASLM through a refractive index variation.

While in the aforementioned embodiments the reflection element has an elliptically curved reflecting surface with two focal points, the reflection element may for example also comprise multiple segments, very much like a Fresnel lens, where a multitude of focal points are so close to each other that they appear as one focal point.

Instead of a mechanical curvature of the reflection element, as explained in the aforementioned embodiments, it is also possible to create only the effect of a curved reflection element, e.g. by means of a flat holographic optical element (HOE), a static diffractive optical element (DOE) or a refractive index variation. A combination of mechanical curvature of the reflection element and HOE, DOE or refractive index variation is also possible.

In alternative embodiments it is also possible that the reflection element is integrated between semiconductor layer and substrate, or behind the substrate, seen from the focal points. As in any other embodiment, it must be ensured that the reconstruction light waves are not absorbed in the semiconductor layer, that the semiconductor layer must only be affected by the writing light of the deflection control means, and that the writing light cannot be perceived by the observer in the visibility region. In order to achieve this, the reflection element can for example be at least partly transparent in several respects, e.g. only in partial areas, only in one direction, only for selected wavelengths, only for certain polarisations or combinations thereof. It is further possible that the reflection element reflects or at least partly reflects in both directions. Alternatively, these functions can be achieved by one or several additional layers or elements. It is also possible that the semiconductor layer is written to from the direction that faces away from the focal points of the reflective optical system, i.e. the deflection control means 43 is disposed on the side facing away from the focal points of the reflective optical system (FIG. 3*b*). According to the particular embodiment, reconstruction light waves and writing light should have the relevant properties, e.g. differ in polarisation or wavelength. It is further possible that by selecting a certain angle of incidence of the writing light it is avoided that writing light is perceived by the observer in the visibility region.

It is further possible that the semiconductor layer has a band structure which can only be affected by the writing light, but not by the reconstruction light waves, i.e. reconstruction light waves and writing light have different energy levels, and only the energy level of the writing light is capable of affecting the semiconductor layer.

As an alternative to using a single scanning laser beam, multiple scanning laser beams may be used, each of which only writes to a subsection of the OASLM. If only one scanning laser beam is used for writing, it must satisfy great demands, because it must have both a very small focal point and a large scanning range.

Further, the deflection control means 42 for writing the diffractive structure on to the deflection element can have the form of an electronically addressable spatial light modulator (EASLM) 46, shown in FIG. 3*a*.

Further, the OASLM can alternatively be controlled by exposure to an interference pattern which is generated by interference of two coherent light sources 44, 45 shown in FIG. 3*a*, which may for example be linked using optical fibre cables or a beam splitter, and which are disposed in the entry-side focal point and in the exit-side focal point. This interference pattern on the semiconductor layer causes the refractive index variation in the OASLM. This method works very much like the holographic exposure of a light-sensitive film. The hologram exposed in the OASLM reconstructs in the entry-side focal point the light source in the exit-side focal point during the subsequent scanning with a light source.

Alternatively or additionally to the (possibly virtual) position change of the pupil, the reflective optical system or parts thereof may also perform a movement, e.g. tilting or turning, in order to position the exit-side focal point to the eye position of the observer and to position the entry-side focal point on the pupil. This movement may again only be generated virtually, i.e. by further controllable reflecting elements.

Even in the case that the observer moves at a right angle towards or away from the reflective optical system, it is possible that the position of the entry-side focal point is controlled such that the semi-minor axis coincides with the optic axis of the reflective optical system, and that the position of the pupil is adapted at least virtually using optical aids to the position of the entry-side focal point. In addition, the control of the position of the entry-side focal point perpendicular to the reflective optical system can be employed in order to enlarge or diminish the holographically reconstructed scene for the observer.

According to further embodiments, the reconstruction means can for example comprise a system of optical elements.

Further, it is possible that the required diffractive structure is sequentially written to the OASLM, in order to sequentially generate a visibility region for the eyes of one or multiple observers, respectively. In order to display a coloured holographic reconstruction, partial reconstructions which represent the individual primary colours are generated sequentially, and the diffractive structures which correspond with the specific wavelengths are sequentially written to the OASLM.

Summarising, this invention provides a reflective optical system which allows aberrations which occur in the system to be corrected on the one hand, and which allows the observer(s) of a holographically reconstructed scene to move within a certain range while the visibility region is tracked to his/their actual eye position on the other hand. Moreover, this invention allows larger reconstructions of holographic scenes to be achieved than possible with prior art solutions, while minimising the demands made on the optical components of the system.

The solutions according to this invention can be used commercially in multiple ways. They can be used in private and industrial applications, for example, in the entertainment industry, automotive industry, medicine etc., for displaying three-dimensional scenes.

The invention claimed is:

1. Holographic projection system for projecting a holographically reconstructed scene, comprising Reconstruction light source means for generating reconstruction light waves, At least one holographic reconstruction means in the form of a spatial light modulator for modulating the reconstruction light waves and for emitting modulated reconstruction light waves towards a pupil, which is disposed in a Fourier plane of the spatial light modulator for filtering the modulated reconstruction light waves, and further comprising An optical reflection system with A reflection element for reflecting the modulated reconstruction light waves which are filtered by the pupil, said reflection element having an elliptically curved reflecting surface with an entry-side focal point disposed in the pupil, from which the reconstruction light waves come when they hit the reflection element, and an exit-side focal point, to which the reconstruction light waves propagate after being reflected from the reflection element, and in front of which the scene is holographically reconstructed, A deflection element with optically controllable deflection properties, and A deflection control means for optically controlling the deflection properties of the deflection element for controlling the position of the exit-side focal point to a position of observer eyes as detected by an eye position detection means.

2. Holographic projection system according to claim 1, where the deflection control means is provided for optically controlling the deflection properties of the deflection element for controlling the position of the entry-side focal point.

3. Holographic projection system according to claim 1, where the deflection control means is provided for optically controlling the deflection properties of the deflection element for correcting aberrations.

4. Holographic projection system according to claim 1, where the reflection element is at least partly transparent.

5. Holographic projection system according to claim 1, where the reflection element is integrated into the deflection element.

6. Holographic projection system according to claim 1, where the deflection element has an optically controllable diffractive or refractive structure or where the deflection element has an optically controllable diffractive and refractive structure.

7. Holographic projection system according to claim 1, where the deflection element is an optically addressable spatial light modulator.

8. Holographic projection system according to claim 7, where the optically addressable spatial light modulator comprises A first glass plate with a transparent electrode, An LC layer which comprises LC (liquid crystal) molecules whose orientation can be changed by way of optical control, A photosensitive semiconductor layer, and A second glass plate.

9. Holographic projection system according to claim 8, where the photosensitive semiconductor layer is at least partly transparent.

10. Holographic projection system according to claim 8, where the semiconductor layer exhibits a band structure which is affectable by the deflection control means.

11. Holographic projection system according to claim 1, where the deflection control means for controlling the deflection properties of the deflection element is disposed in the entry-side focal point and facing away from the exit-side focal point.

12. Holographic projection system according to claim 1, where the deflection control means comprises two interfering coherent light sources, where for controlling the deflection properties of the deflection element the two interfering coherent light sources are disposed in the entry-side focal point and in the exit-side focal point, and whose interference pattern controls the deflection properties of the deflection element.

13. Holographic projection system according to claim 1, where the deflection control means is designed in the form of an electronically addressable spatial light modulator for projecting writing light onto the deflection element, the deflection element being designed in the form of an optically addressable spatial light modulator and the deflection properties of the deflection element being controlled by the writing light.

14. Holographic projection system according to claim 1, where the deflection control means is a scanning laser beam which is intensity-controlled, for scanning the deflection element.

15. Holographic projection system according to claim 1, where the optical reflection system comprises a dichroic layer or where the reflection element exhibits dichroic properties, where the reconstruction light waves and the writing light provided by the deflection control means differ in wavelength and where the deflection properties of the deflection element are controlled by the writing light.

16. Holographic projection system according to claim 1, where the optical reflection system comprises a reflective polarisation filter or where the reflection element exhibits the properties of a polarisation filter, where the reconstruction light waves and the writing light provided by the deflection control means differ in polarisation and where the deflection properties of the deflection element are controlled by the writing light.

17. Holographic projection system according to claim 1, where the deflection control means for controlling the deflection properties of the deflection element provides writing light in a wavelength range which is invisible for the human eye.

18. Holographic projection system according to claim 1, comprising a position control means for controlling the position of the pupil or of an identical image of the pupil to the entry-side focal point of the optical reflection system.

19. Holographic projection method for projecting holographically reconstructed scenes, comprising the steps of
  Generation of modulated reconstruction light waves by a holographic reconstruction means in the form of a spatial light modulator,
  Positioning of an entry-side focal point of an elliptically curved reflecting surface of an optical reflection system and a pupil disposed in a Fourier plane of the spatial light modulator in relation to each other,
  Filtering the modulated reconstruction light waves towards the optical reflection system with the help of the pupil,
  Reflection of the filtered, modulated reconstruction light waves from the elliptically curved reflecting surface of the optical reflection system and generation of a holographic reconstruction of a scene in front of an exit-side focal point of the elliptically curved reflecting surface of the optical reflection system,
  Optical control of the deflection properties of a deflection element of the optical reflection system for controlling the position of the exit-side focal point of the elliptically curved reflecting surface of the optical reflection system to a position of observer eyes as detected by an eye position detection means.

* * * * *